United States Patent [19]

Bonnefon et al.

[11] 4,123,476

[45] Oct. 31, 1978

[54] REINFORCED PLASTIC MATERIAL AND A PROCESS FOR THE PRODUCTION THEREOF

[75] Inventors: Alain Bonnefon, Epinay-sur-Seine; Alain Coupard, Asnieres; Michel Maffre, Versailles, all of France

[73] Assignee: Pneumatiques, Caoutchouc Manufacture et Plastiques Kleber-Colombes, France

[21] Appl. No.: 639,307

[22] Filed: Dec. 10, 1975

Related U.S. Application Data

[63] Continuation-in-part of Ser. No. 463,186, Apr. 22, 1974, abandoned.

[30] Foreign Application Priority Data

Apr. 20, 1973 [FR] France ............................... 73.14721

[51] Int. Cl.² ...................... C08L 23/06; C08L 23/08

[52] U.S. Cl. ............................ 260/897 A; 260/897 B; 260/897 C; 260/876 R; 264/210 R; 264/210 F; 428/516; 428/518

[58] Field of Search ............ 260/897 C, 897 A, 897 B

[56] References Cited

U.S. PATENT DOCUMENTS

| | | | |
|---|---|---|---|
| 3,474,049 | 10/1969 | Chappelear et al. | 260/897 A X |
| 3,499,822 | 3/1970 | Rasmussen | 260/897 |
| 3,511,742 | 5/1970 | Rasmussen | 260/897 B |
| 3,965,055 | 6/1976 | Shichman et al. | 260/3 |

*Primary Examiner*—Carman J. Seccuro
*Attorney, Agent, or Firm*—Craig & Antonelli

[57] ABSTRACT

A reinforced composite plastic material has a matrix of thermoplastic material in which is dispersed at least 5% by weight of a polyethylene having a very high molecular weight. The reinforcing polymer is in the form of fine particles which, in large proportion, are drawn out in the form of elongated fibrils which impart considerable strength to the resulting composite plastic material.

4 Claims, No Drawings

REINFORCED PLASTIC MATERIAL AND A PROCESS FOR THE PRODUCTION THEREOF

This application is a continuation-in-part of parent application Ser. No. 436,186, filed Apr. 22, 1974, now abandoned.

The present invention relates to flexible reinforced plastic materials used to manufacture finished or semi-finished products such as sheets, bands, strips, sections, hoses, etc.

It is already known to produce composite mixtures of nonmiscible plastic materials in which one of the plastic materials is dispersed in the other plastic material in the form of reinforcing fibrils distributed at random. Mixtures of this type have been proposed, for example, for producing synthetic papers having substantially equal resistance properties in all directions.

In contrast, the object of the present invention is to obtain flexible thermoplastic products having very marked anisotropic properties and a much higher resistance in a longitudinal direction than the resistances in the other transversal directions at right angles to this longitudinal direction.

The products according to the invention are also composite products comprising a matrix of a thermoplastic (base) material containing a reinforcing polymer in the form of fibrils but in order for these products to be economically viable for a variety of applications, it is essential that the resistance to elongation in the longitudinal direction should be far higher than the resistance to elongation of the base material forming the matrix and this resistance must correspond to a resistance to breaking of at least 400kg/cm$^2$ and a breaking elongation of lower than 10%, e.g. from 2% to 8%. The marked anisotropy of these products according to the invention may be illustrated by comparison of the moduli of elasticity or tensile strength measured for the same elongations both in the longitudinal direction of high resistance and in the transversal directions of lower resistance; the first being at least 8 times higher than the second. The composite products according to the invention contain 5 – 100 parts by weight of a crystalline polyethylene having a molecular weight at least equal to and often greater than 500,000 per 100 parts by weight of the flexible thermoplastic material constituting the matrix; the polyethylene being in the form of elongated fibrils having a diameter less than 5 microns and a length of at least 2 mm and a dominant orientation in the longitudinal direction. As a result of this dominant orientation in the longitudinal direction as well as the high modulus and the high tensile strength of the fibrils, the products are anisotropic and generally have an anisotropic ratio between the elastic moduli (or tensile strength) at 1% of elongation in the longitudinal and transverse directions that ranges from 8:1 to 75:1 and preferably from 8.8:1 to 65:1 as stated in the examples herebelow disclosed.

Depending on the method of working employed, thermoplastic products reinforced according to the invention may be in the form of thin sheets of indefinite length, bands or strips, and sectional pieces having a solid or hollow section, for example, pipes. The polymeric fibrils can impart to products obtained in this way a resistance to elongation analogous to that obtained with reinforcing textile cord plies. The products in the form of sheets, bands or strips may also be substituted in the case of certain applications textiles coated with plastic materials. These sheets may be joined or bonded together to obtain composite products having a stratified structure in which the high resistance to elongation of the constituent elements is used in a plurality of directions. Hence, for example, it is possible to superpose and join two or more sheets or layers each possessing marked anisotropic properties owing to the orientation of the fibrils but ensuring in the course of this assembling operation that the direction of orientation of the fibrils is alternated at least in the case of two sheets in the assembly. In this way, it is possible to obtain a flexible composite sheet having a high resistance to elongation in at least two directions orientated at right angles to each other or at different angles with respect to each other.

The thermoplastic materials which may be used for the products in question are plastic materials having a softening temperature which is lower than the melting point of the reinforcing polyethylene. The thermoplastic materials must also be compatible and non-miscible with the reinforcing polyethylene. These thermoplastic materials are preferably flexible at ambient temperature. Of these thermoplastic materials it is contemplated to include, for example polyvinyl chloride, low density and low molecular weight polyethylene, ethylene and vinyl acetate copolymers or ethylene and vinyl chloride copolymer.

The crystalline polyethylene incorporated in the matrix of plastic material must have a very high molecular weight so as to be able to form fibrillar crystals consisting of sufficiently long extended chains.

It is possible to use polyethylenes having an average molecular weight, measured by light scattering, which is equal to or greater than ca, 500,000. The reinforcing fibrils consisting of this type of polyethylene provide the end product with a very high resistance in the direction of orientation of the fibrils such that in the case of fibrils having a dominant orientation parallel to the longitudinal direction, the end product will have a much higher resistance in this direction than that which it would have possessed if the fibrils had been oriented at random without a preferential direction. To obtain a high resistance in this longitudinal direction, the polyethylene content of the product must accordingly be relatively low. The content of reinforcing polyethylene may be 5 – 100 parts by weight per 100 parts of the flexible thermoplastic material forming the matrix depending on the desired value for the resistance. For production and economic reasons the polyethylene content is generally between 10 and 50 parts by weight per 100 parts by weight of the thermoplastic material forming the matrix.

The reinforced thermoplastic products indicated above may be obtained by a process, which consists in kneading the matrix of thermoplastic material and particles of the polyethylene having a very high molecular weight at a temperature close to and preferably higher than the melting point of the polyethylene and preferably in the range of 146 to 158° C. to obtain a fibrillation in situ of the polyethylene particles; and then in treating the kneaded mixture so as to keep the particles in the form of elongated fibrils in the final product.

The matrix of plastic material and the polyethylene may be mixed in the cold state in solid form as powders or granules or they may be mixed under heat in the melted state or softened by heat. However, it is always necessary to knead the mixture under the action of heat in order to melt the polyethylene and to develop in the course of this operation, shearing and elongation forces which produce a division of the largest particles as well as the drawing out or extruding of a considerable proportion of these particles which will then form elongated fibrils which may have a diameter in the order of 1 micron and a length in the order of 2 to 30 mm.

The kneading operation may be carried out in any type of mixing apparatus, but when it is effected or terminated in a conventional cylinder mixer, there is a more or less marked orientation of the polyethylene fibrils in the drawing or stretching of the sheet between the cylinders. The same applies when the mixture, having already been prepared, is thereafter treated in the heated state in a device which draws out the mixture such as a calender or an extruder. The products obtained or formed from the calender or extruder having a high degree of anisotropy, that is, a higher resistance to elongation in the longitudinal direction than in the transversal direction with respect to the direction of orientation of the fibrils. Thus it will be understood that after mixing the mixture must be shaped into an elongated product by calendering, extruding or like forming operation.

When the product has been mixed under heat, as indicated above, in order to obtain a fibrillation in situ of the polyethylene particles and then shaped, it is essential to treat the product immediately so as to preserve the fibrillated state or condition of the polyethylene. In fact, it has been observed that, if no particular precaution is taken, the polyethylene fibrils of the mixture tend to contract or shrink as result of the visco-elastic forces being induced, and to be transformed into particles which are not elongated, or hardly elongated at all. Such shrinked products do not have a high anistropic ratio.

One procedure or expedient of treatment for keeping the polyethylene particles in the product in the form of elongated fibrils consists in cooling the mixture to a temperature lower than the melting temperature of the polyethylene while keeping it under tension to prevent the product from contracting or shrinking.

It is believed that this cooling under tension of the mixture contributes significantly to fixing the polyethylene particles drawn out in fibrils and the molecular orientation of the fibrils which thereafter can no longer be elastically contracted within the mixture. When the mixture has been worked on a cylinder mixer or in a calender, or in any other apparatus which produces the preferential orientation of the fibrils, the cooling under tension of the sheets or bands of the mixture produces products having a high resistance to elongation in the longitudinal direction and a very high ratio of anisotropy.

The cooling process for products under tension can take place in the open air or in water after discharge from the forming apparatus. For this purpose, tension is exerted upon the sheet or strip to be treated so that such sheet or strip will not shrink through contraction during cooling. The rate of tension may be higher than the rate of contraction in order to obtain an elongation of the sheet or strip, this elongation being limited by the necessity of preventing breakage of the sheet or the strip. The rate of elongation can be determined through the ratio between the speed of the sheet or strip after cooling and the speed of the sheet or strip at the discharge point of the forming apparatus. The values of the rate of elongation generally lie between 1 and 2, preferably between 1 and 1.5.

With such products of plastic material, reinforced by polyethylene of high molecular weight, it has been observed that the fibrils which were produced with said polyethylene have themselves a crystalline structure and orientation which give to the polyethylene in these fibrils mechanical properties which are different from those of the original polyethylene, in particular, a modulus of elasticity and breakage resistance which is much higher than the modulus and breakage resistance of the original polyethylene. The following table shows these differences of properties between a polyethylene having a very high molecular weight molded in bulk at 160° C and a network of fibrils made with the same polyethylene, said network of fibrils having been isolated from the plastic matrix which contained this network, through removal of the matrix by means of a solvent.

| | Modulus Young ($Kg/cm^2$) | Breakage Resistance ($Kg/cm^2$) | Elongation at Rupture % |
|---|---|---|---|
| Sample of polyethylene at high molecular weight 1,000,000 obtained by molding. | 5,000–10,000 | 450 | 450 |
| Fibril network in longitudinal direction obtained thru removal of matrix | 50,000–200,000 | 2,500–5,500 | 2–8 |

Another indication of the particular structure of polyethylene transformed into fibrils is given by the characteristics of the melting properties. Whereas the original polyethylene has only one melting point, the polyethylene converted into fibrils has two.

Measurements taken with a differential calorimeter Perkin-Elmer DSC 1B (speed of heating 8° C per minute) have shown the following results:

| | Melting Point |
|---|---|
| Original polyethylene in powder form | 139° C. |
| Original polyethylene molded en masse | 132° C. |
| Polyethylene converted into fibrils | 125° and 152° C. |

Besides, it has been observed that in the case of polyethylene converted to fibrils the first melting point may vary slightly, depending on operating conditions, between 120° and 132° C. In contrast thereto, the second melting point has an abnormally high value compared to the well-known melting point of the original polyethylene, and one will find this second melting point only in polyethylene converted into fibrils which has the above-cited high mechanical properties.

Several examples for preparing the products according to the present invention will be described hereinafter by way of non-limitative examples only. In these examples, the parts are parts by weight.

EXAMPLE 1

Four batches of mixtures having a polyvinyl chloride base are prepared which include a reinforcing polyethylene, namely a crystalline polyethylene having a high density and a very high molecular weight (average molecular weight of 1,000,000 measured by light scattering in the form of a fine powder having an average granulometry in the order of 100 microns and a melting point of 138° C.

The pulverulent products (PVC, stearate and the polyethylene) and the plasticizers are first mixed in the cold state using a mixer. These mixtures are worked on a cylinder mixer heated to 152°–153° C. and kneaded for 3 to 6 minutes. The mixtures are then extruded from the mixer in the form of thin sheets which are cooled under tension to prevent them from contracting longitudinally. The products obtained have the following compositions and properties:

| Composition Ingredients- Parts by Wt. | Batch No. | | | |
|---|---|---|---|---|
| | 1 | 2 | 3 | 4 |
| Matrix (pulverulent PVC) | 48 | 48 | 48 | 48 |
| P.7* | 5 | 5 | 5 | 5 |
| Plasticizer : dibutylphthalate | 20 | 20 | 20 | 20 |
| Anti-oxiding agent: Staviner BC-206 | 2 | 2 | 2 | 2 |
| Reinforcing polyethylene | 0 | 10 | 22 | 40 |

*P.7 is a graft PVC polyethylene produced by Solvay and used as a compatibility coupling agent between PVC and the reinforcing polyethylene.

TABLE 1

Properties of Products Obtained From Batch Nos. 1-4

| | Longitudinal Direction | | | Transverse Direction | | | | |
|---|---|---|---|---|---|---|---|---|
| Batch No. | Stress at 1% Elongation (Kg/cm$^2$) | Resistance to Breaking (Kg/cm$^2$) | Breaking Elongation % | Stress at 1% Elongation (Kg/cm$^2$) | 20% (Kg/cm$^2$) | Resistance to Breaking (Kg/cm$^2$) | Breaking Elongation % | Anistropic Ratio |
| 1 (control) | 1.1 | 144 | 205 | 1.1 | 20 | 144 | 205 | 1/1 |
| 2 | 101 | 381 | 7.5 | 8.4 | 75 | 150 | 115 | 12/1 |
| 3 | 162 | 640 | 5.8 | 14 | 104 | 100 | 110 | 11.5/1 |
| 4 | 230 | 898 | 4.2 | 22 | 110 | 132 | 55 | 10.5/1 |

It will be noted that product nos. 2, 3 and 4 have very different properties of elasticity in the longitudinal and transversal directions; the resistances in the longitudinal direction being considerably higher. The anistropic ratio (AR) obtained from comparison of the elasticity moduli or tensile strength at 1% in the longitudinal and transversal directions are 10.5/1 to 12/1. These products have a translucid, homogeneous appearance, and on observing the material through the microscope it was noted that the polyethylene has been reduced to the state of elongated fibers which may be slightly entangled but have a generally dominant direction of orientation. This network of fibrils and their orientation are the reason for the increased resistance to elongation of the products in the longitudinal direction.

The poor resistances in the transversal direction which also bears out the orientation of the fibrils, may be avoided by superposing at least two identical sheets in such a way that the direction of orientation of the fibrils is alternated from one sheet to another.

EXAMPLE 2

Four mixtures are prepared which have a vinyl acetate-ethylene copolymer base containing 9% vinyl acetate (Alathon resin E. VA 3120, produced by du Pont de Nemours) and polyethylene having a high molecular weight such as that used in Example 1. The mixtures have the following compositions:

| Ingredients (parts by wt. | Mixture No. | | | |
|---|---|---|---|---|
| | 1 | 2 | 3 | 4 |
| E. VA 3120 resin | 100 | 100 | 100 | 100 |
| Polyethylene | 0 | 10 | 30 | 50 |

For the mixtures 2, 3 and 4, the pulverulent polyethylene is incorporated on a cylinder mixer at 120° C. The temperature of the cylinders is then raised to 149°, 150°, or 152° C., respectively, and the mixtures are worked for 8, 10 or 15 minutes, respectively, to knead them and produce fibrillation of the polyethylene. The mixtures are then extruded each in the form of a thin sheet which is 0.2 mm. thick. These sheets are then cooled under tension to prevent them from contracting.

The products obtained have the following properties:

TABLE 2

| | Longitudinal Direction | | | Transverse Direction | | | | |
|---|---|---|---|---|---|---|---|---|
| Mixture No. | Stress at 1% Elongation (Kg/cm$^2$) | Resistance to Breaking (Kg/cm$^2$) | Breaking Elongation % | Stress at 1% Elongation (Kg/cm$^2$) | 20% (Kg/cm$^2$) | Resistance to Breaking (Kg/cm$^2$) | Breaking Elongation % | Anistropic Ratio |
| 1 (control) | 11.9 | 201 | 585 | 11.9 | 76 | 201 | 545 | 1/1 |
| 2 | 169 | 458 | 6.2 | 12.7 | 81 | 131 | 277 | 13.3/1 |
| 3 | 385 | 960 | 3 | 12 | 86 | 103 | 135 | 32/1 |
| 4 | 560 | 1371 | 2.8 | 14.5 | 88 | 97 | 101 | 38.6/1 |

Same mixtures as nos. 2, 3 and 4 are then heated (annealed) for 1 hour at 140° C. while preventing shrinking, in order to improve the crystalline structure of the polyethylene drawn out in the form of fibrils. They have then the following properties:

TABLE 3

| Mixture No. | Longitudinal Direction | | | Transverse Direction | | | Anisotropic Ratio |
|---|---|---|---|---|---|---|---|
| | Stress at 1% Elongation (Kg/cm$^2$) | Resistance to Breaking (Kg/cm$^2$) | Breaking Elongation % | Stress at 1% 20% Elongation (Kg/cm$^2$) | Resistance to Breaking (Kg/cm$^2$) | Breaking Elongation % | |
| 2A | 232 | 556 | 6 | 14  96 | 168 | 210 | 16.5/1 |
| 3A | 500 | 1350 | 4.1 | 15  99 | 162 | 140 | 33/1 |
| 4A | 742 | 1831 | 3.1 | 22  110 | 167 | 112 | 33.8/1 |

EXAMPLE 3

As in the preceding Example, mixtures are prepared which comprise a vinyl acetate-ethylene copolymer base containing 18% vinyl acetate (Alathon resin E. VA 3170, produced by du Pont de Nemours) and polyethylene having a high molecular weight. The mixture has the following composition:

| Ingredients (parts by wt.) | Mixture No. | | |
|---|---|---|---|
| | 1 | 2 | 3 |
| E. VA 3170 | 100 | 100 | 100 |
| Polyethylene | 0 | 30 | 60 |

The pulverulent polyethylene is incorporated in the mixtures 2 and 3 at 120° C. in an open cylinder mixer. The temperature of the cylinders of the mixer is then raised to 146° or 148° C., respectively, for the kneading operation which lasts for 28 or 35 minutes, respectively. At the end of each operation, a sheet is extruded which is cooled under tension and which possesses a thickness of 0.2 mm.

Products obtained have the following properties:

TABLE 4

| Mixture No. | Longitudinal Direction | | | Transverse Direction | | | Anisotropic Ratio |
|---|---|---|---|---|---|---|---|
| | Stress at 1% Elongation (Kg/cm$^2$) | Resistance to Breaking (Kg/cm$^2$) | Breaking Elongation % | Stress at 1% 20% Elongation (Kg/cm$^2$) | Resistance to Breaking (Kg/cm$^2$) | Breaking Elongation % | |
| 1 (Control) | 4.4 | 197 | 736 | 4.4  41 | 197 | 736 | 1/1 |
| 2 | 264 | 712 | 3.6 | 5  56 | 100 | 245 | 53/1 |
| 3 | 421 | 1158 | 3.3 | 6.5  64 | 94 | 185 | 65/1 |

It will be noted that products obtained according to the invention have great strength in the longitudinal direction of orientation of the polymer fibrils.

EXAMPLE 4

Two plastic mixtures reinforced with polyethylene having a high molecular weight such as that according to Example 1 and a control mixture (No. 1) are prepared. The matrix of these mixtures consists of polyethylene of low density (Lacqtene 1020, produced by ATO Plastics Company). The compositions are as follows:

| Ingredients (parts by wt.) | Mixture No. | | |
|---|---|---|---|
| | 1 | 2 | 3 |
| Lacqtene 1020 | 95 | 95 | 95 |
| Ethylene-Propylene rubber (plasticizer) | 5 | 5 | 5 |
| Polyethylene | 0 | 10 | 30 |
| Alkyl-bisphenol (anti-oxidizer) | 1 | 1 | 1 |

The incorporation of the pulverulent polyethylene is effected on a cylinder mixer at a temperature of 120° C. The mixtures No. 2 and No. 3 are thereafter kneaded for 12 minutes at 153° C. and a thin sheet is extruded which is cooled under tension. The properties of the products are the following:

TABLE 5

| Mixture No. | Longitudinal Direction | | | Transverse Direction | | | Anisotropic Ratio |
|---|---|---|---|---|---|---|---|
| | Stress at 1% Elongation (Kg/cm$^2$) | Resistance to Breaking (Kg/cm$^2$) | Breaking Elongation % | Stress at 1% 20% Elongation (Kg/cm$^2$) | Resistance to Breaking (Kg/cm$^2$) | Breaking Elongation % | |
| 1 (control) | 16 | 164 | 450 | 16  102 | 164 | 450 | 1/1 |
| 2 | 253 | 535 | 2.9 | 27  93 | 102 | 65 | 9.4/1 |
| 3 | 486 | 1129 | 2.7 | 55  95 | 95 | 14 | 8.8/1 |

EXAMPLE 5

Mixtures 1 and 2 are prepared which have a graft PVC polyethylene base (P.7 produced by Solvay as in example 1) containing 50% polyethylene.

Mixture 2 contains a reinforcing polyethylene having a high molecular weight. The mixtures have the following composition:

| Ingredients (parts by wt.) | Mixture No. | |
|---|---|---|
| | 1 (Control) | 2 |
| P.7 (matrix) | 48 | 48 |
| diocytlphthalate } plasticizer | 7.5 | 7.5 |
| tricresylphosphate) | 7.5 | 7.5 |
| Pb. Stearate | 2 | 2 |
| Polyethylene | 0 | 24 |

The pulverulent products (P.7, Pb stearate, and polyethylene) and the plasticizers are first mixed in the cold state using a powder mixer. These mixtures are placed on a mill mixer heated to 157° C. and kneaded for 3 minutes. The mixtures are then extruded from the mill each in the form of a thin sheet. Sheet of mixture 2 is cooled under tension to prevent it longitudinal shrinkage. The products obtained have the following properties:

TABLE 6

| | Longitudinal Direction | | | Transverse Direction | | | |
|---|---|---|---|---|---|---|---|
| Mixture No. | Stress at 1% Elongation (Kg/cm²) | Resistance to Breaking (Kg/cm²) | Breaking Elongation % | Stress at 1% 20% Elongation (Kg/cm²) | Resistance to Breaking (Kg/cm²) | Breaking Elongation % | Anisotropic Ratio |
| 1 (control) | 2.1 | 94 | 175 | 2.1   33 | 94 | 175 | |
| 2 | 195 | 585 | 4.1 | 5.2   67 | 76 | 40 | 37.5/1 |
| 2A | 240 | 900 | 4.3 | 7.6   94 | 124 | 80 | 31.5/1 |

Mixture 2A is a sheet of same composition than mixture 2 but further heated (annealed) for 1 hour at 140° C. while preventing shrinking. Properties of mixture 2A are increased mainly in the longitudinal direction.

The preceding examples illustrate the various combinations of materials contemplated by the invention in the area of reinforcing plastic materials. The present invention is obviously not limited to these examples which make it possible to consider other applications. It will also be understood that other common ingredients such as additives or colorants may be admixed with these plastic materials.

It will be understood that the proportion of polyethylene particles drawn into fibrils will vary, according to the method, temperature and time of kneading but in accordance with this invention at least about 50% but usually 80-90% by weight of the particles added are subsequently in the form of fibers or fibrils. Also, the sizes of the polyolefin particles added initially to the thermoplastic are between about 20 and 400 microns.

While the novel principles of the invention have been described, it will be understood that various omissions, modifications and changes in these principles may be made by one skilled in the art without departing from the spirit and scope of the invention.

What is claimed is:

1. A flexible anisotropic plastic material having in a longitudinal direction a resistance to breaking higher than 400 kg/cm² with a breaking elongation lower than 10% and an elasticity modulus at least 8 times greater than the elasticity modulus in the other transversal directions perpendicular to said longitudinal direction; said flexible plastic material comprising a matrix of thermoplastic material and 5-100 parts by weight of a reinforcing polymer which is not miscible with said matrix, said polymer consisting of a crystalline polyethylene having a molecular weight at least equal to 500,000 and being in the form of elongated fibrils having a diameter less than 5 microns, a length greater than 2 mm. and a dominant orientation in the longitudinal direction; said thermoplastic material forming the matrix having a lower softening point than the melting point of the reinforcing polyethylene and said thermoplastic material of the matrix being selected from the group consisting of polyvinyl chloride, polyethylene having a low molecular weight and an ethylene and vinyl acetate or vinyl chloride copolymer.

2. A reinforced plastic material as claimed in claim 1, wherein the content of said reinforcing polymer is between 10 and 50 parts by weight per 100 parts of the thermoplastic material forming the matrix.

3. A reinforced plastic material as claimed in claim 1, wherein the elongated fibrils have a diameter on the order of 1 micron and a length on the order of 2 to 30 mm.

4. A reinforced plastic material as claimed in claim 1, wherein said plastic material has an anisotropic ratio between the elastic moduli at 1% of elongation in the longitudinal and transverse direction that ranges from 8:1 to 75:1.

* * * * *